(12) United States Patent
Kim et al.

(10) Patent No.: US 8,093,376 B2
(45) Date of Patent: Jan. 10, 2012

(54) METHOD FOR PREPARATION OF HIGH ENZYMATIC RESISTANCE HYDROXYALKYLCELLULOSE DERIVATIVES

(75) Inventors: Seok Soo Kim, Daejeon (KR); Jung Ho So, Daejeon (KR); Il Yong Lee, Daejeon (KR); Hee Won Hwang, Daejeon (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 575 days.

(21) Appl. No.: 11/721,104

(22) PCT Filed: Dec. 17, 2004

(86) PCT No.: PCT/KR2004/003335
§ 371 (c)(1),
(2), (4) Date: Jun. 1, 2009

(87) PCT Pub. No.: WO2006/062268
PCT Pub. Date: Jun. 15, 2006

(65) Prior Publication Data
US 2009/0299051 A1 Dec. 3, 2009

(51) Int. Cl.
C08B 1/00 (2006.01)
C08B 11/00 (2006.01)
C08B 11/20 (2006.01)
C08B 11/08 (2006.01)
C08B 37/00 (2006.01)

(52) U.S. Cl. ............. 536/124; 536/56; 536/84; 536/85; 536/95; 536/96

(58) Field of Classification Search .............. None
See application file for complete search history.

(56) References Cited

U.S. PATENT DOCUMENTS

| 3,903,076 A * | 9/1975 | Krumel et al. ........... 536/85 |
| 4,009,329 A | 2/1977 | Arney et al. |
| 5,989,329 A | 11/1999 | Sau |
| 7,402,668 B2 * | 7/2008 | Dannhorn et al. ........ 536/124 |

FOREIGN PATENT DOCUMENTS

| EP | 1411065 | * | 4/2004 |
| JP | 2003-171401 A | | 6/2003 |
| KR | 10-0152177 A | | 10/1998 |

OTHER PUBLICATIONS

International Search Report dated Sep. 7, 2005 in PCT Application PCT/KR2004/003335, which is the international application of this application.
International Preliminary Examination Report dated Mar. 23, 2007 in PCT Application PCT/KR2004/003335, which is the international application of this application.
Written Opinion dated Sep. 7, 2005 in PCT Application PCT/KR2004/003335, which is the international application of this application.

* cited by examiner

*Primary Examiner* — Traviss C McIntosh, III
(74) *Attorney, Agent, or Firm* — Knobbe, Martens, Olson & Bear, LLP

(57) ABSTRACT

The present invention relates to a process of preparing hydroxyalkyl cellulose derivatives having improved enzymatic resistance. In particular, the present invention relates to a process of preparing hydroxyalkyl cellulose derivatives by reacting cellulose and ethylene oxide in the presence of alkali metal hydroxide, wherein the reaction between cellulose and ethylene oxide is performed in the presence of isopropyl alcohol azeotropic solvent in a horizontally agitated reactor, wherein the ethylene oxide is supplied via two steps, thus resulting in a two-step reaction, and the amount of alkali metal hydroxide remaining after the first reaction is controlled, thereby enabling to provide hydroxyalkyl cellulose derivatives having improved enzymatic resistance and turbidity and to remarkably decrease the solvent usage to have economical and environmental advantages.

8 Claims, No Drawings

METHOD FOR PREPARATION OF HIGH ENZYMATIC RESISTANCE HYDROXYALKYLCELLULOSE DERIVATIVES

TECHNICAL FIELD

The present invention relates to a process of preparing hydroxyalkyl cellulose derivatives having improved enzymatic resistance, and in particular relates to a process of preparing hydroxyalkyl cellulose derivatives by reacting cellulose and ethylene oxide in the presence of alkali metal hydroxide, wherein the reaction between cellulose and ethylene oxide is performed in the presence of isopropyl alcohol azeotropic solvent in a horizontally agitated reactor, the ethylene oxide is supplied in two steps, thus resulting in a two-step reaction, and the amount of alkali metal hydroxide remaining after the first reaction is controlled, thereby enabling to provide hydroxyalkyl cellulose derivatives having improved enzymatic resistance and turbidity and to remarkably decrease the solvent usage with economical and environmental advantages.

RELATED PRIOR ART

Hydroxyalkyl cellulose ether, especially hydroxyethyl cellulose, has been widely used in producing latex paint, joint cement and mortar for various uses, performing an emulsion polymerization and oil drilling. Further, it is a useful aqueous cellulose ether because it can be prepared from a natural material.

There have been known various methods to prepare cellulose ether as follows.

According to U.S. Pat. No. 4,009,329, a reactor was charged with a predetermined amount of pulverized pulp and fifteen times the weight of a diluent, and purged with nitrogen. Sodium hydroxide and lithium hydroxide were added and the mixture was agitated for 45 min. 30 wt % of ethylene oxide, relative total amount of ethylene oxide to be used, was added and the system was heated up to 70° C. for 1-2 hrs, and then a first reaction was performed for 1 hr. After the reaction was completed, the system was treated with 40-50% of acetic acid into neutralization, and the remaining 70% of ethylene oxide was further added. The mixture was heated up to 75° C. for 1 hr, and a second reaction was performed for 60 min. The mixture was filtered with acetone to provide cellulose ether.

However, there were also drawbacks as described below: (i) the yield of ethylene production was relatively low (45%), the enzymatic resistance was also low (50%) and (iii) the turbidity of 1% solution was very high (above 70 NTU). The low commercial productivity, which is caused by use of an excess solvent and difficulty of recycling the solvent, was also known to be very serious. Further, financial burden is tremendously increased in primary cost because the yield of ethylene oxide, which takes 50% in primary cost, is as low as less than 50%. Furthermore, it is also not environment-friendly because the unreacted materials and side products inflow in waste water.

Of these problems, the use of excess solvent is most serious because it requires a huge equipment, a sophisticated process and a huge investmental cost, which make its commercial application difficult.

Meanwhile, U.S. Pat. No. 5,989,329 discloses the followings. To a vertically-agitated Chemco® reactor containing a mixture of 925 g of t-butyl alcohol, 120 g of water and 27 g of sodium hydroxide was added 84 g of cellulose pulp. The resulting mixture was vigorously stirred at room temperature for 1 hr and then 80 g of ethylene oxide was added. The resulting mixture was heated at 70° C. for 1 hr. Then, the reaction mixture was cooled to 50° C., and 52 g of 70% nitric acid and 57 g of additional ethylene oxide were added. The resulting reaction mixture was heated at 95° C. for 90 min, cooled to 50° C. and neutralized with 9 g of 70% nitric acid. It was then filtered and the residue was washed three times with 80% acetone aqueous solution, and then the purified polymer was dehydrated with acetone. The dehydrated polymer was further dried in a fluid bed drier at 50° C. for 0.5 hr. The produced hydroxyalkyl cellulose was verified to have a molar substitution of ethylene oxide (MSEO) of 4.3 and a viscosity (1% solution) of 3,350 cps.

However, low productivity caused by excess solvent usage was also admitted in the U.S. patent due to the use of the vertically-agitated reactor. Pulp filled in a vertical reactor generally causes high-density stacking, which may be serious drawback for commercialization because it requires a certain amount of reaction solvent for agitation and influences a production per reactor. Further, among the important factors to enhance the enzymatic resistance, the individual ratio of ethylene oxide supply and the neutralization ratio after the $1^{st}$ reaction have not been studied in detail.

The enzymatic resistance is demanded for use of hydroxyethyl cellulose in paint composition. Otherwise, the coating layer may gather mold or fall off in several months. Meanwhile, a high amount of un-reacted pulp may increase turbidity of a solution and result in an unfavorable coating layer such as unsmooth surface, craters and aggregation of small particles.

Conclusively, the conventional method of preparing hydroxyalkyl cellulose has problems that (i) large amount of energy is needed to purify and recycle the used excess solvent, (ii) the commercial unit productivity decreases because the portion of initial investment increases with the increase of equipment, (iii) the yield of ethylene oxide is as low as being less than 50%, thus increasing prime cost and financial burden, (iv) the enzymatic resistance is low when hydroxyethyl cellulose is used in aqueous paint, thus not being appropriate for use and storage, and (v) the turbidity is low with the following unfavorable coating surface.

The present inventors have performed intensive researches to solve the aforementioned problems in preparing hydroxyalkyl cellulose ether, such as an excess use of a solvent, a low yield of ethylene oxide production, low enzymatic resistance and high turbidity. As a result, they finally discovered that these problems may be overcome by reacting cellulose and ethylene oxide in the presence of alkali metal hydroxide, wherein the reaction between cellulose and ethylene oxide is performed in the presence of isopropyl alcohol azeotropic solvent in a horizontally agitated reactor, wherein the ethylene oxide is supplied in two steps, thus resulting in a two-step reaction, and the amount of alkali metal hydroxide remaining after the first reaction is controlled, thereby enabling to provide hydroxyalkyl cellulose derivatives having improved enzymatic resistance and turbidity and to remarkably decrease the solvent usage with economical and environmental advantages.

Therefore, the present invention relates to a process of preparing hydroxyalkyl cellulose derivatives having improved enzymatic resistance and turbidity along with economic and environmental efficiency by optimizing the reaction conditions such as kind of solvent, reactant supply time, usage and remaining amount of alkali.

DETAILED DESCRIPTION

The present invention relates to a process of preparing hydroxyalkyl cellulose comprising steps of:

(a) preparing a mixture of cellulose and isopropyl alcohol azeotropic solvent in a horizontally agitated reactor equipped with a baffle in an upper portion of the reactor, (b) activating the cellulose by adding alkali metal hydroxide in the mixture, thereby preparing an activated mixture, (c) performing a first reaction by adding ethylene oxide and isopropyl alcohol azeotropic solvent in the activated mixture, thereby preparing a first reaction solution, (d) cooling the first reaction solution and controlling the amount of the alkali metal hydroxide remaining in the first reaction solution by adding isopropyl alcohol azeotropic solvent in the first reaction solution, (e) performing a second reaction by adding ethylene oxide in the first reaction solution, thereby preparing a second reaction solution, and (f) separating and filtering the second reaction solution, followed by its neutralization to pH 5-7 and drying.

Hereunder is provided a detailed description of the present invention.

The present invention aims to provide hydroxyalkyl cellulose derivatives with improved enzymatic resistance and turbidity by optimizing the type of a reactor, solvent, supply time and amount of reactants and the amount of remaining alkali.

Conventional methods of preparing hydroxyalkyl cellulose derivatives have drawbacks in economical and environmental aspects due to the use of a great quantity of a solvent and decrease in ethylene oxide yield along with the problems of low enzymatic resistance and turbidity.

In contrast, the present invention uses a horizontally-agitated reactor with a baffle equipped in the upper portion of the reactor instead of conventional vertically-agitated reactor thus remarkably reducing the solvent usage, and also optimizes the usages and supply time of solvent and ethylene oxide and the amount of remaining alkali metal hydroxide in each step to increase efficiency of the reactor, thereby finally improving the enzymatic resistance and turbidity of hydroxyalkyl cellulose derivatives. Especially, reaction is performed in two steps and ethylene oxide is supplied during each of the two steps. A step of neutralization into a predetermined pH range was performed between the two reaction steps to cause more hydroxyl groups at the second and the third carbon positions to be substituted with ethylene oxide, thus increasing the resistance to the enzymatic degradation and resultant enzymatic resistance of hydroxyalkyl cellulose derivatives.

Four reactive sites in cellulose unite are hydroxyl groups at $2^{nd}$, $3^{rd}$, $6^{th}$ carbons and $X^{th}$ carbon combined to the $6^{th}$ carbon. Reactivity of each site varies depending on the concentration of used alkali metal hydroxide. The $6^{th}$ and $X^{th}$ sites are most reactive, and $2^{nd}$ and $3^{rd}$ sites are difficult to be substituted in this order. More than three consecutive unsubstituted hydroxyl groups in cellulose chain are generally known to cause the enzyme to easily attack the cellulose, thus deteriorating the enzymatic resistance. Thus, for increasing enzymatic resistance, uniform substitution is important let alone total substitution. Alkalinity above 1.3 molar ratio increases reactivity of hydroxyl groups at $6^{th}$ and $X^{th}$ sites, thus causing partial substitution. On the contrary, hydroxyl group at $2^{nd}$ carbon has relatively high reactivity when the alkalinity is low below 0.5 molar ratio. For the uniform substitution, the reactivity of each hydroxyl group should be controlled by neutralization after the first reaction, thus controlling molar ratio of remaining alkali and enabling to decrease the unreacted portion and obtain a clean and transparent aqueous solution.

However, enzymatic resistance and turbidity may not be controlled only by controlling of molar ratio because they may vary with slight change of mixing ratio depending on reactor type and kind, concentration and usages of the solvent.

Therefore, the method herein optimizes reactor type, supply time and usage of reactants and kind, concentration and usages of solvent and also controls the amount of remaining alkali, thus enabling to remarkably reducing solvent usages and improving enzymatic resistance and turbidity.

The present invention is related to an economical, environment-friendly and commercially profitable method for preparing hydroxyalkyl cellulose derivatives, whereby the properties of hydroxyalkyl cellulose derivatives are improved.

Each step of the method herein is described in detail hereunder.

The first step is admixing pulverized cellulose and isopropyl alcohol azeotropic solvent in a horizontally agitated reactor.

A reactor modified from Lodige reactor (Germany) may be used as the horizontally agitated reactor without any limitation on its capacity (small-sized reactor with 3-130 L, medium-sized one with 20-30 $m^3$ and large-sized one above 30 $m^3$).

A reactor (5 L) is used in one embodiment of the present invention, and the detailed description of it is provided below.

The type reactor has a horizontal cylindrical shape, of which one end is bolt-connected to a removable cap plate to maintain the pressure and the other end is connected to a motor through a main axis for a motor-agitated mixing. The main axis is equipped with double-side mechanical seals for securing pressurized agitation. The main axis has shovel-shaped impellers mounted at 60° with reference to each other. Both the ends of the reactor have devices for scraping raw material from sticking to wall.

Further, there are 3-5 feeding lines, which are removably connected to the upper portion of the reactor with bolt and nut, for being appropriate in the use of solid, liquid and gaseous raw material. The lower sides of the lines are equipped with heads having at least two spray nozzles for efficiency injection of raw material.

The diameter and length of the reactor except the head part is predetermined for maximizing the agitation efficiency. A reactor, commercially available from Lodige Corp. (Germany) is used in the present invention. It is preferred to have the diameter/height ratio of 2,500-2,800 when the effective reaction volume is less than 30 $m^2$. The ratio is preferred to be below 2,500 when the effective volume is above 30 $m^2$. The aforementioned ratio is preferred because it is related with the solvent usage along with the agitation efficiency.

However, the horizontally-agitated reactor has problems that the raw material disperses into excess space in upper portion of the reactor, thus failing in participating in the reactor with resultant low reaction yield and productivity. The excess space, amounting to at least 10% of reactor diameter, may be found in an input zone or heat transfer zone. The raw material usually disperses into these zones by agitation without taking part in the reaction, thus resulting in serious problems, such as lowered reaction yield, non-uniform reaction and deteriorated colorimetry and turbidity.

Therefore, according to one aspect of the preset invention, there is provided a horizontally-agitated reactor, wherein baffles are equipped on the upper portion of the reactor for allowing raw material to disperse into excess space and to participate in the reaction.

The baffle is generally referred to a device for controlling the flow of fluid or sound. In the present invention, baffles are preferred to have 5-100 holes, with diameter of 2-5 mm, across upper and lower sides of the baffles, for allowing raw material to participate in the reaction. The baffles may be Teflon or SUS.

The cellulose is pulverized into particles with a size of preferably 100-500 µm, more preferably 150-350 µm. The filtration time may be elongated against productivity when the size is below 100 µm. In contrast, the reaction time may be elongated due to lowered reactivity of cellulose when the size is above 500 µm.

Further, the conventional isopropyl alcohol azeotropic solvent may be used in the present invention. Preferably, isopropyl alcohol alone or a mixture of isopropyl alcohol and co-solvent selected from acetone, t-butyl alcohol and methanol. The co-solvent is preferred to be used in an amount of 80-90 wt % based on the weight of the isopropyl alcohol. When the usage of the co-solvent is below 80 wt %, a product may be dissolved during the reaction due to excess water. When the usage is above 90 wt %, yield may decrease and turbidity may increase. The isopropyl alcohol azeotropic solvent is preferred to be used in an amount of 2-5 parts by weight based on 100 weight parts of the cellulose. When the usage is below 2 weight parts, the alkalization reaction may decrease due to low water concentration in the cellulose. When the usage is above 5 weight parts, the yield and the enzymatic resistance may decrease due to excess water concentration.

The second step is activating the cellulose by adding alkali metal hydroxide in the mixture of the first step, thus activating the mixture.

As used herein, 'alkali metal hydroxide' is intended to include without limitation alkali metal or alkali metal hydroxide, preferably sodium metal or sodium hydroxide. This alkali metal hydroxide is preferred to be used in an amount of 1-10 weight parts based on 100 weight parts of the cellulose. When the usage is less than 1 weight part, the mixture may not be sufficiently activated. When the usage is above 10 weight parts, there may be problems of product discoloration or decrease in yield.

The third step is performing a first reaction by adding ethylene oxide and isopropyl alcohol azeotropic solvent in the activated mixture. The reaction temperature is elevated up to 60-110° C. for about one hr, and the reaction is performed for 40-100 min. When the initial reaction temperature is below 60° C. it may requires a longer reaction time, while it may be difficult to control temperature due to abrupt temperature elevation when the initial temperature is above 110° C.

The ethylene oxide is preferred to be used in an amount of 0.1-5 weight parts based on 100 weight parts of the cellulose. When the usage is below 0.1 weight part, it may be difficult to obtain desired enzymatic resistance, substitution and turbidity. When the usage is above 5 weight parts, environmental load of waste water may be increased because excess ethylene oxide may inflow in waste water. Further, isopropyl alcohol azeotropic solvent is preferred to be used in an amount of 0.1-1 weight parts to control water amount in reaction system. When the usage is below 0.1 weight parts, the turbidity may increase due to low water content. When the usage is above 1 weight part, the yield and the enzymatic resistance may be lowered due to excess water.

The fourth step is cooling the first reaction solution of the third step, adding isopropyl alcohol azeotropic solvent, and controlling the amount of remaining alkali metal hydroxide by neutralization. The reaction temperature is preferred to be within 30-40° C. When it is below 30° C., reaction time may be extended too long, while there may be a problem in controlling the reaction heat when it is above 40° C. Further, the control of the remaining amount is a technique critical in controlling the activity of each hydroxide to achieve a uniform substitution. Specifically, the uniform substitution can be obtained by controlling the molar ratio of remaining alkali with neutralization after the first reaction. As a result, a clean and transparent liquid product may be prepared due to a low unreacted portion. Conventional acid may be used, and preferably nitric acid or acetic acid may be used in an amount that alkali metal hydroxide may be maintained in 0.01-0.20 moles, more preferably 0.01-0.10 moles, based on 1 mole of cellulose. When the molar ratio is below 0.01, there may be problems of low substitution or high turbidity. When molar ratio is above 0.20, there may be problems of low yield and enzymatic resistance.

The isopropyl alcohol azeotropic solvent is added to uniformly admixing reactants, control the reaction rate of ethylene oxide, improve degradation resistancy, and increase turbidity, preferably in an amount of 2-8 weight parts based on 100 weight parts of cellulose. When the usage is below 2 weight parts, it may be difficult to obtain a uniform mixing and turbidity may also be deteriorated. When the usage is above 8 weight parts, there may be problems of low yield and enzymatic resistance.

The fifth step is performing the second reaction by adding ethylene oxide in the reactants prepared in the fourth step. Reaction temperature is elevated up to 60-110° C. for about 1 hr, and reaction is performed for about 60-120 min. When the temperature is below 60° C., it will require a much longer reaction time. When the temperature is above 110° C., there may be problems of low viscosity and discoloration. The reaction time for this process is preferred to be longer than that for the first reaction for inducing uniform substitution of ethylene oxide. The reaction may not be terminated when the reaction time is less than 60 min, while there may be problems of low viscosity and discoloration when the time is above 120 min.

As compared in the third step, this ethylene oxide plays an important role in additional uniform substitution of ethylene oxide in cellulose with decrease in crystallinity. The ethylene oxide is preferred to be used in an amount of 0.5-5 weight parts based on 100 weight parts of cellulose. When the usage is below 0.5 weight parts, there may be problems of low substitution and high turbidity. When usage is above 5 weight parts, the environmental load may be increased because excess ethylene oxide may inflow in waste water.

The sixth step is separating and filtering off the product in the fifth step, followed by the second neutralization to pH 5-7 and drying. The products are separated from the reaction solvent was filtered off according to a conventional method by using a filter and 80% acetone aqueous solution as filtration solvent. After filtration, the second neutralization is performed to pH 5-7 by using nitric acid or acetic acid, followed by drying at 60-70° C. for 30-60 min. When the temperature is below 60° C., it may be difficult to remove water. When the temperature is above 70° C., there may be a problem of discoloration.

Representative examples of the hydroxyalkyl cellulose derivatives herein include but are not limited to hydroxyethyl cellulose, low- and high-substituted hydroxypropyl cellulose, hydroxybutyl cellulose, hydroxyethylhydroxypropyl cellulose, hydroxyethyl cellulose substituted with $C_4$-$C_{24}$ hydrophobic alkyl, allyl or a combination thereof and carboxymethylhydroxyethyl cellulose.

Their viscosity may be within 5-7,000 cps (based on 1% solution, 20° C., 20 rpm, viscometer of Brookfield Corp.), and molar substitution may be $MS_{EO}$ 0.8-45.0, $MS_{PO}$ 0.8-4.0, $DS_{CM}$ 0.1-2.0, MS(hydroxyethyl cellulose substituted with a hydrophobic group) 0.1-1.0.

The method for preparing hydroxyalkyl cellulose derivatives via 6 steps using a horizontally agitated reactor have advantages of increasing synthesis yield of ethylene oxide, remarkably decreasing the solvent usage and improving enzymatic resistance and turbidity of hydroxyalkyl cellulose ether to be prepared as a result.

EXAMPLES

The present invention is described more specifically by the following Examples. However, they should not be construed as limiting the scope of the present invention.

Example 1

In a horizontally-agitated high pressure reactor (100 L), 6 kg of finely pulverized cellulose was added. As a solvent, azeotropic solvent comprising water and isopropyl alcohol was added in an amount of 3 weight parts based on 100 weight parts of cellulose, and the solution was stirred at 10 rpm for 10 min. Oxygen was removed from the reactor by maintaining −0.9 bar vacuum and 3 kg/cm² of nitrogen substitution pressure, thus causing cellulose to be swelled. 5 weight parts of 50% sodium hydroxide solution was added based on 100 weight parts of cellulose, and the solution was stirred for 10 min to be activated. Ethylene oxide was added in an amount of 0.25 weight parts based on 100 weight parts of cellulose, and 0.8 weight parts of azeotropic solvent comprising water and isopropyl alcohol was further added. The temperature was elevated up to 75° C. for 60 min and the first reaction was performed for 60 min.

After the solution was cooled to 35° C. and azeotropic solvent comprising water and isopropyl alcohol was added in an amount of 4 weight parts based on 100 weight parts of cellulose, and the solution was neutralized with nitric acid. Neutralization was performed so that the weight ratio of sodium hydroxide to initial cellulose can be set at 0.03.

Ethylene oxide was further added in an amount of 1.1 weight parts based on 100 weight parts of cellulose, and the temperature was elevated up to 75° C. for 60 min. The second reaction was performed for 90 min to provide hydroxyethyl cellulose.

Azeotropic solvent comprising water and isopropyl alcohol was added in an amount of 4 weight parts based on 100 weight parts of cellulose. The solution was stirred for 5 min, and the azeotropic solvent was removed by filtration.

The solution was dispersed by using a filtering solvent of 80% acetone aqueous solution, neutralized to pH 5-7 with nitric acid, and finally filtered. The filtrate was dried in fluidized bed drier at 65° C. for 40 min.

The dried hydroxyethyl cellulose was pulverized by using a ACM type pulverizer, and 9.3 kg of hydroxyethyl cellulose that passed through a 80 mesh screen.

Examples 2-6 & Comparative Example

The same process with Example 1 was performed except that the reaction conditions were changed as shown in Table 1.

TABLE 1

| Examples | | Reactor type | Solvent (wt parts) | Molar ratio of [NaOH]/[pulp] | | 1st addition (ethylene oxide) |
|---|---|---|---|---|---|---|
| | | | | After addition | After 1st neutralization | |
| Ex. | 1 | Horizontal | IPA (8) | 1.10 | 0.03 | 20 |
| | 2 | Horizontal | IPA (7) | 1.20 | 0.05 | 15 |
| | 3 | Horizontal | IPA (8) | 1.15 | 0.07 | 15 |
| | 4 | Horizontal | IPA (8) | 1.20 | 0.05 | 19 |
| | 5 | Horizontal | IPA (7) | 1.23 | 0.12 | 19 |
| | 6 | Horizontal | IPA (7) | 1.12 | 0.18 | 20 |
| Comp. Ex. | 1 | Vertical | IPA (15) | 1.45 | 0.7 | 50 |
| | 2 | Horizontal | IPA (15) | 1.45 | 0.7 | 50 |
| | 3 | Horizontal | IPA (8) | 1.45 | 1.45 | 50 |

Experiment Examples

With regard to the hydroxyethyl cellulose prepared in Examples 1-6 and Comparative Examples 1-3, enzymatic resistance, turbidity, ethylene oxide synthesis yield, ash content, 1% aqueous solution viscosity, viscosity maintenance rate and molar substitution of ethylene oxide (MSEO) were measured and provided in Table 2.

[Measurement Method]

1. Enzymatic resistance (Rate of Viscosity Maintenance):

Pulverized hydroxyethyl cellulose was dissolved in water to provide 1% aqueous solution. The solution was inoculated with 10 ppm of cellulose based on the amount of solution. The viscosity was measured continuously at 30° C. and after 120 min.

2. Turbidity: measured by using a turbidity meter (Haake Corp.)

3. Ash Content: the value converted into sodium sulfate

4. The viscosity (1% aqueous solution): measured by using viscometer at 20° C. and 20 rpm (Brookfield Corp.)

TABLE 2

| Examples | | Enzymatic Resistance (%) | Turbidity (NTU) | Synthesis yield of ethylene oxide (%) | Ash Content (%) | Visocosity (1%, cps) | Molar substitution ($MS_{EO}$) |
|---|---|---|---|---|---|---|---|
| Ex. | 1 | 88 | 3 | 75 | 1.15 | 5600 | 4.0 |
| | 2 | 86 | 3 | 78 | 1.20 | 6200 | 4.2 |
| | 3 | 85 | 4 | 75 | 1.17 | 5800 | 4.3 |
| | 4 | 92 | 3 | 77 | 1.05 | 5700 | 4.1 |
| | 5 | 89 | 5 | 75 | 1.10 | 6100 | 3.9 |
| | 6 | 87 | 4 | 76 | 1.13 | 5900 | 4.2 |
| Comp. Ex. | 1 | 22 | 77 | 44 | 5.9 | 3500 | 2.4 |
| | 2 | 55 | 25 | 61 | 3.1 | 5000 | 3.3 |
| | 3 | 15 | 55 | 35 | 4.2 | 3000 | 2.3 |

As shown in Table 2, as compared with Comparative example (vertical type) and Comparative Example (horizontal type), Examples 1-6, which adopted a horizontally-agitated reactor and optimized reaction conditions, showed remarkably improved enzymatic resistance, turbidity, yield of ethylene oxide production, ash content, 1% solution viscosity and molar substitution of ethylene oxide ($MS_{EO}$). Further, the use of horizontally-agitated reactor remarkably reduces the solvent usage, and thus decreases the equipment. Especially, the enzymatic resistance and turbidity were improved, thus providing a long-term stability and uniform surface.

As set forth above, the hydroxyalkyl cellulose derivatives prepared according to the present invention have remarkably improved enzymatic resistance and turbidity along with decreased usage of a solvent having advantages in economical as well as environmental aspects.

What is claimed is:

1. A process of preparing hydroxyethyl cellulose by reacting cellulose with ethylene oxide in the presence of alkali metal hydroxide, said process comprising:
   (a) preparing a mixture of cellulose and isopropyl alcohol azeotropic solvent in a horizontally agitated reactor equipped with a baffle in an upper portion of said reactor,
   (b) activating said cellulose by adding alkali metal hydroxide in the mixture, thereby preparing an activated mixture,
   (c) performing a first reaction by adding ethylene oxide and isopropyl alcohol azeotropic solvent in said activated mixture, thereby preparing a first reaction solution,
   (d) cooling said first reaction solution and controlling the amount of the alkali metal hydroxide remaining in said first reaction solution by adding isopropyl alcohol azeotropic solvent in said first reaction solution,
   (e) performing a second reaction by adding ethylene oxide in said first reaction solution, thereby preparing a second reaction solution, and
   (f) separating and filtering said second reaction solution, followed by its neutralization to pH 5-7 and drying.

2. The process of claim 1, wherein said cellulose is pulverized into powders having a particle size of 100-500 μm.

3. The process of claim 1, wherein said isopropyl alcohol azeotropic solvent is isopropyl alcohol alone or a mixture of isopropyl alcohol with a co-solvent selected from the group consisting of acetone, tert-butyl alcohol and methanol.

4. The process of claim 1, wherein said hydroxyethyl cellulose has enzymatic resistance of higher than 80% and synthesis yield of the ethylene oxide of higher than 75%.

5. The process of claim 1 comprising:
   (a) preparing a mixture of 100 weight parts of cellulose and 2-5 weight parts of isopropyl alcohol azeotropic solvent in a horizontally agitated reactor equipped with a baffle in an upper portion of said reactor,
   (b) activating said cellulose by adding 1-10 weight parts of alkali metal hydroxide in said mixture, thereby preparing an activated mixture,
   (c) performing a first reaction by adding 0.1-5 weight parts of ethylene oxide and 0.1-1 weight parts of isopropyl alcohol azeotropic solvent in said activated mixture, thereby preparing a first reaction solution,
   (d) cooling said first reaction solution and controlling the amount of the alkali metal hydroxide remaining in said first reaction solution within 0.01-0.2 molar ratio by adding 2-8 weight parts of isopropyl alcohol azeotropic solvent in said first reaction solution,
   (e) performing a second reaction by adding 0.5-5 weight parts of ethylene oxide in said first reaction solution, thereby preparing a second reaction solution, and
   (f) separating and filtering said second reaction solution, followed by its neutralization to pH 5-7 and drying.

6. The process of claim 5, wherein said cellulose is pulverized into powders having a particle size of 100-500 μm.

7. The process of claim 5, wherein said isopropyl alcohol azeotropic solvent is isopropyl alcohol alone or a mixture of isopropyl alcohol with a co-solvent selected from the group consisting of acetone, tert-butyl alcohol and methanol.

8. The process of claim 5, wherein said hydroxyethyl cellulose has enzymatic resistance of higher than 80% and synthesis yield of the ethylene oxide of higher than 75%.

* * * * *